United States Patent Office 2,971,845
Patented Feb. 14, 1961

2,971,845

CONTINUOUS BREAD MAKING METHODS

Charles G. Ferrari, Evanston, Ill., assignor to J. R. Short Milling Company, Chicago, Ill., a corporation of Illinois No Drawing. Filed June 27, 1958, Ser. No. 744,896

3 Claims. (Cl. 99—90)

This invention relates to processes for producing baked goods and more particularly to improvements in the so-called continuous bread making process.

Until recently, bread was manufactured commercially by what is known in the chemical arts as a "batch" method. That is, given quantities of dough-forming ingredients were mixed to form a dough sufficient to produce a certain number of loaves, and such dough was moved progressively through the conventional steps in the bakery. With the advent of bakeries of unusually large size, a distinct need has been recognized for a continuous bread making process of such nature that the necessary ingredients could be fed continuously into a substantially automatic apparatus capable of providing finished loaves of bread continuously.

Such a continuous process has been developed and is now in commercial operation. For successful continuous operation, that process depends largely upon two special steps. First, before the flour is incorporated, a brew is prepared by mixing water, yeast, yeast food and sugar, the brew being allowed to ferment for flavor production, rather than yeast propagation. Second, after a preliminary mixing of this brew and other dough-forming ingredients, including the flour, the dough mixture is subjected to a very high speed mixing step capable of developing a complete dough in a relatively short time, on the order of a few minutes. With respect to the present invention, it is important to note that the brew is pre-mixed with the other dough forming ingredients, usually in a device such as an interrupted-screw conveyor, before being delivered to the high speed mixer or dough developer which subjects the preliminary mixture to a very vigorous mechanical working action. While such a pre-mixing step is not adequate to develop a complete dough, the pre-mixing action does accomplish intimate contact between the solid ingredients and the liquid phase of the dough.

Such a continuous process has obvious commercial advantages, perhaps the most important of which is the fact that substantially all of the steps of the method are automatic, so that labor costs are minimized. However, the continuous process departs radically from known bakery methods, and a variety of difficulties have been encountered. One of these difficulties is that, in such a process, there has been no way to introduce bread improver compounds in such fashion that the same will be present in the dough during the high speed mixing step, when development of the dough is in progress.

Considering the conventional additive, calcium peroxide, for example, it is obvious that that compound cannot be successfully added, according to the usual methods of addition, either in the brew or in the pre-mixer since, in either case, the calcium peroxide would be spent before the dough mix found its way into the high speed mixer. On the other hand, the very nature of the high speed mixer, as well as the condition of the dough mix therein, precludes direct introduction of the additive to the high speed mixer.

An object of the present invention is to provide an improved continuous bread making process wherein bread improver agents added upstream from the high speed mixing or dough developing step are made available to the dough during development thereof in the high speed mixing step.

Another object is to devise such a method wherein a bread improver agent is introduced in the pre-mixing step, and there uniformly mixed with the dough forming ingredients, but does not act until the high speed mixing step.

In general, these and other objects of the invention are accomplished by adding to the dough pre-mix a bread improver material consisting of a particulate bread improver the particles of which are enrobed in a protective covering capable of preventing contact between the bread improver and the liquid phase of the dough until the dough mix is subjected to the vigorous action of the high speed mixer or dough developer. In other words, the particles of bread improver are protected by a covering of such nature as to survive both contact with liquid and moderate mechanical working, but be removed promptly by the greater mechanical working which occurs in the high speed mixing or dough developing step. In accordance with one highly advantageous form of the invention, the bread improver is protected by an edible material capable of forming a relatively thick protective covering which is relatively tenacious and survives the conditions of gentle dough mixing but is emulsified in the aqueous phase of the dough as a result of vigorous dough mixing.

The most valuable class of such protective materials embraced by the invention consists of monoglycerides having an iodine value not exceeding 50, mixed mono- and diglycerides, such mixture having an iodine value not exceeding 50, and tartaric acid esters of mono- and diglycerides having an iodine value not exceeding 50. Thus, specific useful protective materials include glyceryl monostearate, glyceryl monopalmitate, the diacetyl tartaric acid ester of glyceryl monostearate and the mixed monoglycerides obtained from lard, vegetable oils and edible animal fats, such mixtures having an iodine value not exceeding 50.

Since these protective materials are employed, in accordance with the invention, in direct contact with inorganic compounds, such as calcium peroxide, which tend to cause rancidity in fats, and since the protected bread improver materials of the invention must be capable of surviving substantial storage periods, it is important that, when the protective material is a monoglyceride, the same not be so unsaturated as to have an iodine value in excess of 50. With monoglycerides having an iodine value in excess of 50, rancidity often forms to such an extent that the material would be considered as unsuitable for use in bread. Thus, monoglycerides derived from soybean or cottonseed oil frequently have an iodine value in excess of 50 and, in that event, are unsatisfactory, as are those containing a substantial proportion of oleic, linoleic, linolenic or arachadonic acid, for example. In connection with the use of commercially available monoglycerides, it is important to note that the presence of relatively small proportions of diglycerides is not deleterious, so long as the diglyceride is stable and derived from a fatty acid such that the iodine value of the total glyceride mixture is not in excess of 50.

While applicable to any suitable particulate bread improver material which would, if added at the pre-mix stage of the continuous bread process, be spent before it had an opportunity to act in the high speed mixing stage where dough development occurs, the invention finds particular use in connection with the inorganic bread improver compounds such as calcium peroxide, the persulfates of calcium, potassium, sodium and ammonium, potassium bromate, potassium iodate, and sodium thiosulfate, for example.

In preparing such particulate bread improvers for use in accordance with the invention, a covering of protective material is applied to the particles of bread improver in such fashion that at least the major proportion of particles are covered by a relatively large amount of the covering material. When employing emulsifiable protective materials as hereinbefore described, an amount of protective material equal to from 50% to 200% of the bread improver agent is employed, a uniform association of the protective and bread improver materials being effected in order to assure that all of the bread improver particles have, for practical purposes, approximately equal protection. Two general preparation procedures are very satisfactory in accomplishing this result. According to one procedure, the desired amount of monoglyceride, for example, is melted in the bowl of a suitable mixing device, the particulate bread improver agent added with continual stirring, and the mixture then cooled to solidify the monoglyceride, the product then being broken up to a convenient particle size. Such a product, in finished form, comprises solid particles of the monoglyceride with substantially all of the bread improver particles completely embedded therein. According to the second procedure, a saturated solution of the monoglyceride in a suitable solvent, such as butanol, is prepared, the bread improver particles then slurried therewith, separated, filtered, reslurried with additional saturated monoglyceride solution, and so forth, until a monoglyceride coating has been built up on each bread improver particle to such an extent that the weight of monoglyceride is equal to at least 50% of the weight of the bread improver agent.

*Example 1*

A. *Preparation of protected bread improver.*—One hundred parts by weight of Myverol Type 18–00, a distilled monoglyceride product of Distillation Products Industries, Rochester, N.Y., derived from edible, fully hydrogenated lard and having an iodine value of approximately 1, a monoester content of at least 90% and a congealing point of 68° C., is melted in the bowl of a motorized mixer. While maintaining the monoglyceride in molten condition, and with continual stirring, 100 parts by weight of finely particulate, food grade calcium peroxide (60% $CaO_2$, all finer than 100 mesh) is added progressively, the mixture gradually taking the form of a thick slurry. When all of the calcium peroxide has been added, and uniform mixing accomplished, the product is allowed to cool to a solid mass which is then disintegrated to roughly 30 mesh and blended with 7300 parts by weight partially dextrinized corn flour as an extender. The finished composition is formulated for use in bread making at the rate of 0.375% of the weight of the total flour employed in the dough, such rate introducing to the dough an amount of calcium peroxide (100%) equal to approximately 0.003% of the total flour weight.

B. *Continuous bread making with such protected bread improver.*—The method is carried out in a commercial scale continuous bread making plant characterized by employing a brew stage, a pre-mixing stage and a final mixing stage wherein the preliminary dough is subjected to such high speed mixing as to develop a complete dough within a few minutes. The brew is prepared by combining yeast, yeast food, water and sugar in a heated mixing vessel and stirring the mixture for 3 hours at 85° F. The fermented brew is run continously through a heat-exchanger to cool the same and the cooled brew is delivered to an elongated interrupted-screw conveyor which constitutes the pre-mixer. The remaining conventional ingredients, comprising flour, salt, additional water, shortening and potassium bromate, are continuously metered into the pre-mixer at rates predetermined to provide the desired dough formulation. Similarly, the monoglyceride-protected calcium peroxide prepared in accordance with section A of this example is metered into the pre-mixer at the rate of 0.375% by weight of the total wheat flour employed in the dough, so that the calcium peroxide (as 100% $CaO_2$) is present in the dough in an amount equal to approximately 0.003% of the total flour weight. The pre-mixer simultaneously conveys the dough mixture to the high speed, final mixing device and accomplishes a uniform, but mild, mixing action.

Those ingredients added to the brew in the pre-mixer are introduced at a point upstream along the conveyor. At a point downstream along the conveyor, as adjacent the discharge end thereof, the mixture is found to be uniform. At this latter point, the particles of monoglyceride-protected calcium peroxide can actually be recovered from the dough mixture and are found to still retain at least the greater proportion of the monoglyceride covering. Thus, while these particles have been in contact with the aqueous phase of the preliminary dough mixture and have been subjected to some mild mechanical working action, the preliminary mixing conditions are not such as to remove the protective coating and expose the calcium peroxide to the aqueous phase of the dough.

The pre-mixing device delivers the preliminary dough directly into the high speed mixer and the latter subjects the mixture to such a fast, rigorous mechanical working that a complete, batter-like dough is developed in a few minutes. The completed dough is extruded continuously through a forming nozzle to produce a continous length of dough and the latter is automatically cut into successive individual pieces of a size suitable for 1-lb. loaves of bread. As they are cut, the dough pieces are dropped into individual baking pans, the pans then conveyed automaitcally to a proofer, where the dough is proofed at 98° F. for 40 minutes, and the loaves are then baked in a continuous oven in the usual fashion. Proceeding in this manner, it is found that, in order to obtain a dough of the desired consistency, it is necessary to employ an additional amount of water, introduced either in the brew or in the pre-mixer or in both of those stages, equal to from 2% to 3%, based on flour weight. This requirement for additional water is the normal "increased water absorption" resulting from use of calcium peroxide in the proportions herein noted. The fact that the increased water absorption does occur is proof that the calcium peroxide acts in the final dough mixing stage and, therefore, that the protective covering is removed in that stage. The loaves of bread produced in this fashion show, to the skilled bread scorer, the well-known effects resulting from the use of calcium peroxide.

*Example 2*

A. *Preparation of protected bread improver.*—In this example, the protective material is a distilled monoglyceride product (Myverol Type 18–30, manufactured by Distillation Products Industries, Rochester, N.Y.) prepared from edible animal fat and having a minimum monoester content of 90%, an iodine value of approximately 40, and a congealing point of approximately 58° C. A fully saturated solution of this monoglyceride product in butanol is prepared and a suitable quantity of commercial food grade calcium peroxide (60% $CaO_2$, all finer than 100 mesh) is slurried with the monoglyceride solution for a few minutes, the initially coated calcium peroxide then being recovered by filtering with the aid of suction, the moist cake being recovered and dried at room temperature. This procedure is repeated, again using a fully saturated solution of monoglyceride in butanol, until the dry, monoglyceride-coated calcium peroxide product has increased in weight by 50% of the weight of the uncoated calcium peroxide. The resulting product consists of particles of calcium peroxide coated with a continuous film of the monoglyceride, the monoglyceride film providing such protection that the product is substantially unaffected by water when stirred therewith at room temperature with a slow speed mixer for 15 minutes. 150 parts by weight of the final monoglyceride-coated calcium peroxide product is blended with 7,350 parts by weight of partially dextrinized corn flour as an extender.

B. *Continuous bread making with such protected bread improver.*—The procedure of Example 1A is repeated, except that the protected calcium peroxide product employed is that of section A of the present example, such product being introduced to the pre-mixing stage at the rate of 0.375% by weight of the total wheat flour in the dough, the 100% calcium peroxide content thus again being 0.003% of the total flour weight. Again, particles of calcium peroxide recovered from the dough at the downstream end of the pre-mixing stage are found to have retained their protective monoglyceride coating. On the other hand, a 2–3% increase in water absorption is noted, proving that the protective coating is removed from the calcium peroxide in the final mixing stage, and the bread obtained shows, to the skilled bread scorer, the usual effects resulting from use of calcium peroxide.

*Example 3*

A. *Preparation of protected bread improver.*—Two hundred parts by weight of the monoglyceride employed in Example 1 is melted in the bowl of a motorized mixer and 100 parts by weight of food grade calcium peroxide (60% $CaO_2$, all finer than 100 mesh) is added thereto with continual stirring and while maintaining the monoglyceride in fully molten condition. The molten monoglyceride, with the calcium peroxide carried therein, is then sprayed through a suitable heated nozzle into a chilling atmosphere to produce a finely pearled product, each pearl of which contains calcium peroxide particles distributed therethrough. In the resulting solidified product, the calcium peroxide is so thoroughly protected by the monoglyceride that the product will survive even 30 minutes of slow speed stirring in water at room temperature with the usual laboratory stirrer. Even though the monoglyceride is fully emulsifiable in water, test samples of the pearled product can be allowed to stand in warm water for periods in excess of one hour without any significant evidence of contact between the water and the calcium peroxide. The pearled, monoglyceride-protected product is blended with partially dextrinized corn flour, as an extender, at the rate of 7300 parts by weight of the corn flour for 300 parts by weight of the pearled product.

B. *Continuous bread making with such protected product.*—The procedure of Example 1A is repeated, except that the pearled calcium peroxide product just described is introduced into the pre-mixer at the rate of 0.375% by weight of the total wheat flour in the dough. The pearled product can be recovered from the dough at the downstream end of the pre-mixer and, when so recovered, evidences little change from its original state. An additional 2–3% of water is again necessary, however, to obtain a final dough of satisfactory condition, and the finished bread again exhibits the usual effects resulting from use of calcium peroxide, demonstrating that the calcium peroxide becomes available in the final mixing stage.

In the foregoing examples, calcium peroxide has been employed as the bread improver agent for purposes of illustrating the invention, since the effects of calcium peroxide are easily recognizable. Any of the foregoing examples can, however, be repeated with any conventional particulate bread improver agent other than calcium peroxide. Since operability of the invention depends upon the nature of the protective material applied to the bread improver particles, and since the protective materials employed are not materially affected by the nature of the bread improver, it will be understood that, broadly, the method of the invention is substantially independent of the specific chemical characteristics of the bread improver particles.

Attention is particularly called to the ability of the emulsifiable materials hereinbefore identified to survive the conditions present in the pre-mixing stage of the continuous bread making process, yet be promptly removed from the bread improver particles, and dispersed in the aqueous phase of the final dough, as a result of the more rigorous mixing conditions of the final dough mixing stage. It is thus to be understood that other edible protective materials, and particularly water soluble materials such as the sugars, starches, and gelatin, for example, cannot be satisfactorily employed in accordance with the invention.

I claim:

1. In the continuous production of bread by preparing a fermented yeast brew, continuously combining the brew with other, conventional dough-forming ingredients, passing the resulting mixture through a preliminary mixing zone and therein subjecting the same to a mild mixing treatment sufficient to produce a uniform mixture, in which the solid ingredients are brought into intimate contact with the liquid phase of the mixture, but insufficient to develop a completed dough, and then subjecting such preliminary dough mixture to a high speed mixing treatment capable of developing a complete dough within a few minutes, the improvement which comprises continually introducing to the preliminary mixing zone a bread improver comprising a particulate bread improver agent selected from the group consisting of calcium peroxide, the persulfates of calcium, potassium, sodium and ammonium, potassium bromate, potassium iodate and sodium thiosulfate, the particles of which carry a continuous protective covering of at least one water-emulsifiable material selected from the group consisting of monoglycerides having an iodine value not exceeding 50, mixed mono- and diglycerides which mixtures have an iodine value not exceeding 50, and tartaric acid esters of mono- and diglycerides having an iodine value not exceeding 50, the amount of said covering being equal to 50–200% of the weight of said bread improver agent.

2. In the continuous production of bread by preparing a fermented yeast brew, continuously combining the brew with other, conventional dough-forming ingredients, passing the resulting mixture through a preliminary mixing zone and therein subjecting the same to a mild mixing treatment sufficient to produce a uniform mixture, in which the solid ingredients are brought into intimate contact with the liquid phase of the mixture, but insufficient to develop a completed dough, and then subjecting such preliminary dough mixture to a high speed mixing treatment capable of developing a complete dough within a few minutes, the improvement which comprises continually introducing to the preliminary mixing zone a particulate bread improver each particle of which consists of a plurality of finer particles of an inorganic bread improver compound selected from the group consisting of calcium peroxide, the persulfates of calcium, potassium, sodium and ammonium, potassium bromate, potassium iodate and sodium thiosulfate distributed within a continuous matrix of at least one water-emulsifiable protective material selected from the group consisting of monoglycerides having an iodine value not exceeding 50, mixed mono- and diglycerides which mixtures have an iodine value not exceeding 50, and tartaric acid esters of mono- and diglycerides having an iodine value not exceeding 50, the amount of said covering being equal to 50–200% of the weight of said bread improver agent.

3. A continuous process for producing bread comprising preparing a fermented yeast brew; continuously combining said brew with other, conventional dough-forming ingredients and a bread improver comprising a finely particulate bread improver compound selected from the group consisting of calcium peroxide, the persulfates of calcium, potassium, sodium and ammonium, potassium bromate, potassium iodate and sodium thiosulfate, the particles of said compound being enveloped in a continuous protective covering of at least one water-emulsifiable material selected from the group consisting of monoglycerides having an iodine value not exceeding 50, mixed mono- and diglycerides which mixtures have an iodine value not exceeding 50, and tartaric acid etsers of mono- and diglycerides having an iodine value not exceeding 50; passing the resulting mixture continuously through a preliminary mixing zone and therein subjecting the mixture to agitation; recovering from said preliminary mixing zone a substantially uniform preliminary dough mix containing said enveloped bread improver compound and delivering said preliminary dough mix to a dough developing zone; subjecting said dough mix to a fast, rigorous mechanical working in said latter zone to develop the same rapidly into a completed dough, and recovering the completed dough, the amount of said covering being equal to 50–200% of the weight of said bread improver compound.

References Cited in the file of this patent

UNITED STATES PATENTS

| | | |
|---|---|---|
| 2,132,436 | Reynolds et al. | Oct. 11, 1938 |
| 2,288,410 | Lippman | June 30, 1942 |

OTHER REFERENCES

"Chemicals by Glyco," 1944, Glyco Products Co., Inc. (Brooklyn, N.Y.), page 33 (Modified Polyhydric Alcohol Esters Glyceryl Monostearate S).

"Modern Methods of Baking," compiled by the Editors and Contributors to Food Engineering, McGraw-Hill Publishing Co., Inc. (New York), pp. 39, 40.

Chemicals by Glyco, Glyco Products Co., Inc. (Brooklyn, N.Y.), 1944, page 35.